1

3,024,263
PROCESS FOR THE PREPARATION OF ANHYDROUS ETHYL SULFURIC ACID
Martin Leatherman, Bel Air, Md., assignor to the United States of America as represented by the Secretary of the Navy
No Drawing. Filed Jan. 7, 1959, Ser. No. 785,536
5 Claims. (Cl. 260—459)
(Granted under Title 35, U.S. Code (1952), sec. 266)

The invention described herein may be manufactured and used by or for the Government of the United States of America for governmental purposes without the payment of any royalties thereon or therefor.

This invention relates to a new and improved process for the production of ethyl sulfuric acid. More specifically the invention relates to an improved process for the manufacture of anhydrous ethyl sulfuric acid for use in the production of diethyl sulfate.

Of the neutral alkyl esters of sulfuric acid diethyl sulfate, $(C_2H_5)_2SO_4$, has been found to be extremely useful as an alkylating agent and has been employed in the production of explosive compounds.

The production of diethyl sulfate is accompanied by many difficulties because of the numerous reactions which can be entered into by the raw materials from which diethyl sulfate can theoretically be synthesized. The prior art discloses various procedures whereby diethyl sulfate can be produced but none of these procedures has been found to give a satisfactory yield for large scale production purposes since these reactions involve ethyl groups and sulfuric acid the interaction of which leads more easily to the production of undesired compounds such as ethylene, ether, alcohol and various degradation products rather than to diethyl sulfate. The reason for this appears to lie largely in the dehydrating tendencies of the sulfuric acid.

For example, one prior art method involves the preparation of ethyl sulfuric acid by reacting ethyl alcohol with an excess of 100 percent sulfuric acid and continuously entraining and carrying out by means of a stream of air the traces of the diethyl sulfate formed in the impure, hydrous ethyl sulfuric acid formed by the reaction. At the same time stoichiometric quantities of ethyl alcohol and sulfuric acid are fed into the reaction vessel for the purpose of making the process a supposedly continuous one. This method has been found to give unsatisfactory yields because the sulfuric acid formed by the reaction speedily stops the formation of diethyl sulfate.

Other prior art methods for the formation of diethyl sulfate are unsatisfactory for different reasons. The reaction of sulfur trioxide and ethyl alcohol requires intense refrigeration to effect the reaction. The reaction of ethylene and sulfuric acid requires the use of an explosive gas.

To overcome the above difficulties it has been proposed to produce diethyl sulfate by the direct vacuum distillation of pure ethyl sulfuric acid into diethylsulfate and sulfuric acid:

(I) $\quad 2(C_2H_5)HSO_4 \rightarrow (C_2H_5)_2SO_4 + H_2SO_4$

This method which is completely described in United States Patent No. 1,411,215 to E. Kuh issued March 28, 1922, requires, however, as a starting ingredient, pure anhydrous ethyl sulfuric acid since any water present causes the decomposition of the ethyl sulfuric acid as follows:

(II) $\quad C_2H_5HSO_4 + H_2O \rightleftharpoons C_2H_5OH + H_2SO_4$

No satisfactory method of producing such needed pure,

2 anhydrous ethyl sulfuric acid is disclosed in the prior art.

Ethyl sulfuric acid may be produced by the action of concentrated sulfuric acid on ethyl alcohol by reversing the reaction of Equation II. The yield of the ethyl sulfuric acid obtained in this process is, however, limited since the reaction also forms water which in turn causes the decomposition of the ethyl sulfuric acid.

It is also well known that ethyl sulfuric acid may be prepared by the decomposition of ethyl alcohol by either sodium bisulfate or ammonium bisulfate according to the following reaction:

(III) $\quad 2NaHSO_4 + C_2H_5OH \rightleftharpoons C_2H_5HSO_4 + Na_2SO_4 + H_2O$ Little use has been found for this reaction, however, since and attempt to distill over diethyl sulfate from the product of this reaction merely reverses the reaction and the alcohol distills over as the only recoverable product.

The difficulties set forth above have been overcome by the applicants discovery that the reaction of Equation III may be employed to produce anhydrous ethyl sulfuric acid in high yield if the proper ambient conditions are employed in the proper sequence.

It is, therefore, an object of the present invention to provide a new and useful process for the preparation of pure anhydrous ethyl sulfuric acid.

Another object is to provide a new and useful process for the production of pure, anhydrous ethyl sulfuric acid from sodium bisulfate formed from impure waste sulfuric acid.

Other objects and the attendant advantages of the invention will become apparent to those skilled in the art as the invention is disclosed in the following detailed description.

In accordance with the present invention pure, anhydrous ethyl sulfuric acid is produced by the reaction of sodium bisulfate with ethyl alcohol under the proper temperature conditions. If ethyl alcohol and sodium bisulfate are reacted and the reaction mixture subsequently cooled to a temperature below that temperature at which the decahydrate of the sodium sulfate is formed (32.3° C.), the water formed by the reaction will combine with the sodium sulfate to form sodium sulfate decahydrate.

It is not necessary to employ anhydrous sodium bisulfate in the process of the invention. For example it has been found that sodium bisulfate prepared from sulfuric acid which contains considerable quantities of water, as much as twenty percent, may be used to produce anhydrous ethyl sulfuric acid by the process of the invention. Even if some ethyl sulfuric acid is decomposed by reaction with the water, subsequent removal of the water by the procedure of the invention causes the ethyl sulfuric acid to be reformed.

The sodium bisulfate used in the process of the invention may be prepared by any suitable method such as by the treatment of ordinary waste sulfuric acid with cheap Glaubers salt in the manner well known in the art.

In practicing the invention it has been found convenient to carry out the reaction between the ethyl alcohol and the sodium bisulfate at the temperature of boiling alcohol by applying just enough heat to the reaction vessel to keep the alcohol at the boiling point to make use of the agitation provided by the boiling liquid. This may be done by suitable means such as a water bath and if loss of the alcohol is prevented by suitable means such as a reflux condenser, then the reaction will proceed to completion without stirring. Stirring, however, serves to expedite the reaction. If too much heat is applied to the reaction vessel without agitation, undesirable reactions may take place at the bottom of the vessel where the temperature rises because of the insulating effect of the salt cake which forms on the bottom.

When the crystals of the sodium bisulfate have disappeared and are replaced with finely divided sodium sulfate particles the reaction is considered to be completed. The slurry thus formed is then cooled with stirring to a temperature below that at which the sodium sulfate forms its decahydrate (32.3° C.) whereupon the sodium sulfate combines with the water present in the reaction mixture and removes it from the solution.

In computing the amount of sodium sulfate required to remove the water formed in the reaction, stoichiometric proportions of the sodium bisulfate and ethyl alcohol will give the maximum yield of ethyl sulfuric acid and the maximum yield of sodium sulfate. For example where commercially available sodium bisulfate monohydrate is employed two molecules of water will appear to be on the right side of the equation:

(IV) 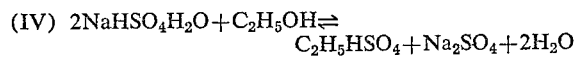
$2NaHSO_4H_2O + C_2H_5OH \rightleftharpoons C_2H_5HSO_4 + Na_2SO_4 + 2H_2O$ If molecular proportions are used 138.08 parts of sodium bisulfate monohydrate and 46.07 parts of ethyl alcohol will form 126.13 parts of ethyl sulfuric acid, 142.05 parts of anhydrous sodium sulfate and 36 parts of water. Upon cooling below 32.3° C. the 142.05 parts of anhydrous sodium sulfate can combine with 180 parts of water to form 322 parts of sodium sulfate decahydrate. Therefore, the 142.05 parts of anhydrous sodium sulfate will have an excess absorbing or combining power amounting to 144 parts of water. This excess combining power is available to remove additional water which may be present in the alcohol or from other sources.

The proportion of the sodium sulfate formed in the above reaction relative to the ethyl sulfuric acid is so great that it may be necessary to add additional ethyl alcohol in order to thin the mixture sufficiently to permit stirring and subsequent filtering off of the hydrated sodium sulfate.

The final filtered product consists of a substantially water free mixture of ethyl sulfuric acid and ethyl alcohol, assuming that ethyl alcohol was added to produce a thinner slurry. The ethyl alcohol may be removed from the mixture by distillation or other suitable means.

Optionally, sufficient sulfuric acid may be added to convert the excess alcohol into ethyl sulfuric acid before the sodium sulfate is removed by filtration and while the mixture is being stirred and cooled to facilitate hydration of the sulfate formed in the reaction. The additional ethyl sulfuric acid formed is likewise dehydrated by the sulfate formed.

The sodium sulfate filter cake may be washed with ethyl alcohol to recover absorbed ethyl sulfuric acid and the wash alcohol reacted with additional sodium bisulfate.

The recovered substantially water free ethyl sulfuric acid may then be converted into diethyl sulfate by slowly adding it to heated anhydrous sodium sulfate in a vacuum distillation vessel while the sodium sulfate is being continuously stirred and mixed as described in the patent to Kuh (supra). The reaction products are diethyl sulfate which distills over and sodium bisulfate which remains behind in the distillation vessel.

The following example of the process of the invention is given by way of illustration only and is not to be considered as limiting the invention in any manner.

*Example*

113 parts by weight of chemically pure sodium bisulfate, monohydrate crystals were mixed with 20 parts by weight of 95% ethyl alcohol in a flask and boiled by heating in a water bath. The crystals disappeared and were replaced by finely divided sodium sulfate particles. The slurry was then cooled with vigorous stirring to a temperature below 32.3° C. and the sodium sulfate decahydrate particles were removed by filtration. The filtrate was distilled to remove the ethyl alcohol. The yield of anhydrous ethyl sulfuric acid was found to be 45.3 parts out of a possible 51.8 parts or 87.4 percent of the theoretical.

The recovered anhydrous ethyl sulfuric acid was converted into diethyl sulfate by adding it dropwise to stirred heated anhydrous sodium sulfate in an evacuated distillation flask. The reaction set forth in Equation I occurred easily at 105° C. at a pressure of 5 to 10 mm. of mercury under which the diethyl sulfate distilled over into the receiving flask.

From the foregoing it may be seen that there has been provided a new and improved process by which anhydrous ethyl sulfuric acid necessary for the efficient production of diethyl sulfate may be easily and efficiently produced from inexpensive materials.

It is to be understood, however, that within the scope of the appended claims the invention may be practiced otherwise than as specifically described.

What is claimed as new and desired to be secured by Letters Patent of the United States is:

1. In the method of preparing anhydrous ethyl sulfuric acid by reacting ethyl alcohol and sodium bisulfate, the improvement consisting essentially of cooling the reaction mixture to a temperature below 32.3° C. the temperature at which sodium sulfate forms its decahydrate, and removing the decahydrate from the reaction mixture.

2. In the method of preparing anhydrous ethyl sulfuric acid by reacting ethyl alcohol and sodium bisulfate, the improvement consisting essentially of cooling the reaction mixture to a temperature below 32.3° C., the temperature at which sodium sulfate forms its decahydrate, removing the decahydrate from the reaction mixture and, subsequently removing any excess ethyl alcohol from the remainder of the reaction mixture.

3. In the method of preparing anhydrous ethyl sulfuric acid by reacting stoichiometric quantities of ethyl alcohol and sodium bisulfate, the improvement consisting essentially of cooling the reaction mixture below 32.3° C. so as to form the decahydrate of the sodium sulfate formed by the reaction, and separating the decahydrate of sodium sulfate from the reaction mixture.

4. In the method of preparing anhydrous ethyl sulfuric acid by reacting ethyl alcohol and sodium bisulfate, the improvement consisting essentially of cooling the reaction mixture below 32.3° C. so as to form the decahydrate of sodium sulfate, and separating the decahydrate of sodium sulfate and any excess ethyl alcohol from the reaction mixture.

5. In the method of preparing anhydrous ethyl sulfuric acid by reacting ethyl alcohol and sodium bisulfate, the improvement consisting essentially of adding sufficient sulfuric acid to the reaction mixture to react with any excess of ethyl alcohol in the mixture, cooling the reaction mixture below the temperature of 32.3° C., at which sodium sulfate forms the decahydrate and, separating the decahydrate of sodium sulfate so formed from the reaction mixture.

References Cited in the file of this patent

UNITED STATES PATENTS 1,427,215    Lilienfeld _____ Aug. 29, 1922

OTHER REFERENCES

Mellor; "A Comprehensive Treatise on Inorganic and Theoretical Chemistry." Volume 2, page 667 (1922).